United States Patent [19]

Arai et al.

[11] Patent Number: 4,570,185
[45] Date of Patent: Feb. 11, 1986

[54] AUTOMATIC FOCUSING APPARATUS FOR VIDEO CAMERA

[75] Inventors: Noboru Arai; Takahiro Ohta; Masafumi Inuiya, all of Saitama, Japan

[73] Assignee: Fuji Photo Film Co., Ltd., Japan

[21] Appl. No.: 397,049

[22] Filed: Jul. 12, 1982

[30] Foreign Application Priority Data

Jul. 16, 1981 [JP] Japan .................. 56-111442

[51] Int. Cl.$^4$ .............................. H04N 5/38
[52] U.S. Cl. ........................ 358/227; 354/404
[58] Field of Search ............ 354/404, 402, 477; 358/213, 212, 227, 225, 214, 209

[56] References Cited

U.S. PATENT DOCUMENTS

| | | | |
|---|---|---|---|
| 4,284,335 | 8/1981 | Takemae et al. | 354/404 |
| 4,301,478 | 11/1981 | Sakane et al. | 358/227 |
| 4,333,716 | 6/1982 | Sakane et al. | 354/25 |
| 4,383,274 | 5/1983 | Inuiya | 358/227 |
| 4,422,097 | 12/1983 | Inuiya | 358/227 |

FOREIGN PATENT DOCUMENTS 0149575 11/1980 Japan .................. 358/227

Primary Examiner—Gene Z. Rubinson
Assistant Examiner—Robert G. Lev
Attorney, Agent, or Firm—Saidman, Sterne, Kessler & Goldstein

[57] ABSTRACT

An automatic focusing apparatus for a video camera, comprising a photographic lens, a solid state image pickup device mounted movably along the optical axis of the photographic lens, a device for moving the image pickup device along the optical axis, and a focusing operation circuit for generating a focusing signal for moving the image pickup device to the focusing point by processing the output of the image pickup device, and feeding the focusing signal to the moving means. The moving device consists of a moving coil secured to the image pickup device, and a drive circuit for driving the moving coil. The focusing operation circuit is connected to the drive circuit directly or via an automatic-manual selecting switch. The image pickup device may be split to a section for taking a picture and a section for measuring the distance from the object, and the photographic lens may be a zoom lens having no mechanism for focusing.

20 Claims, 3 Drawing Figures ary focusing apparatus for a video camera, and more particularly to an automatic focusing apparatus for a video camera using a solid state image pickup device.

AUTOMATIC FOCUSING APPARATUS FOR VIDEO CAMERA

BACKGROUND OF THE INVENTION

1. Field of the Invention

This invention relates to an automatic focusing apparatus for a video camera, and more particularly to an automatic focusing apparatus for a video camera using a solid state image pickup device.

2. Description of the Prior Art

In conventional video cameras, focusing is automatically effected by activating a helicoid drive motor with a position signal fed from a distance measuring device, which measures the distance from the object, thereby controlling the movement of the camera lens. Further, in a video camera using a solid state image pickup device, it has been proposed in Japanese Unexamined Patent Publication No. 55(1980)-149575 to automatically focus the camera by moving the solid state image pickup device instead of the camera lens according to a position signal fed from a distance measuring device of the type described above, thereby simplifying the automatic focusing apparatus.

However, the conventional automatic focusing apparatuses described above require complicated constructions and are expensive because it is necessary to use a distance measuring device, for example one using an ultrasonic wave, for measuring the distance from the object.

SUMMARY OF THE INVENTION

The primary object of the present invention is to provide an automatic focusing apparatus for a video camera using a solid state image pickup device.

Another object of the present invention is to provide an automatic focusing apparatus for a video camera, which can eliminate the use of a distance measuring device and a lens movement mechanism.

The specific object of the present invention is to provide an automatic focusing apparatus for a video camera, in which focusing is effected automatically by a signal fed from a solid state image pickup device.

In the present invention, the solid state image pickup device on which the image of an object is formed by a photographic lens is mounted movably in the direction of the optical axis, and the output of the solid state image pickup device is processed to move the device to the focusing point. Namely, the output signal of the solid state image pickup device is used for focusing instead of the distance measuring device in the conventional automatic focusing apparatus. The solid state image pickup device is moved in the direction of the optical axis, and the focusing point is detected on the basis of the output signal fed therefrom. In this way, the solid state image pickup device is stopped at the detected focusing point to take a picture with the correct focusing point.

The focusing point can be detected on the basis of the output signal of the solid image pickup device in various ways, for example by the methods described in Japanese Unexamined Utility Model Publication No. 53(1978)-95830 and Japanese Unexamined Patent Publication No. 56(1981)-132314.

Preferably, a moving coil is used to move the solid state image pickup device in the direction of the optical axis in accordance with the present invention. This is because, with the moving coil, it is possible to quickly and precisely move the device. However, it is also possible to use a motor gear drive system, a cam drive system, a hydraulic drive system or the like for this purpose.

In accordance with the present invention, the construction of the automatic focusing apparatus is greatly simplified because it is not necessary to use either a distance measuring device or a lens movement mechanism, which are required in the conventional apparatus. Further, since focusing is effected by moving the image pickup device along the optical axis, the design and manufacture of the photographic lens are simplified to a great extent. For example, with the automatic focusing apparatus in accordance with the present invention, it is not necessary to use the helicoid for driving the lens, and therefore the only mechanism required in association with the lens is an aperture diaphragm.

Further, in case the photographic lens is a zoom lens, the only zoom lens mechanism required is a zooming mechanism, while no mechanism for focusing, for example a focusing ring, is necessary, because focusing is conducted by the image pickup device and need not be conducted by the zoom lens mechanism. Accordingly, the design and the construction of the lens are simplified to a great extent in accordance with the present invention.

DESCRIPTION OF THE PREFERRED EMBODIMENTS

The present invention will hereinbelow be described in further detail with reference to the accompanying drawings.

Figure 1:
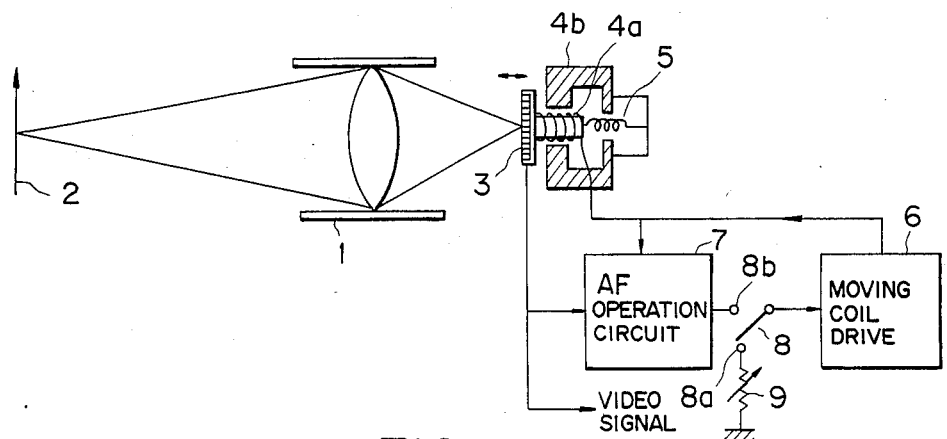
FIG. 1 is a schematic view showing an embodiment of the apparatus in accordance with the present invention provided with an automatic-manual focusing selecting means.

FIG. 1 schematically shows an embodiment of the apparatus in accordance with the present invention, in which an automatic-manual focusing selecting means is provided. In FIG. 1, the image of an object 2 is formed on a solid state image pickup device 3 by a photographic lens 1. The solid state image pickup device 3 may for example be a charge coupled device (CCD) formed by arranging many photosensors in two directions. The solid state image pickup device 3 is fixed on a moving coil 4a capable of moving in the direction of the optical axis of the photographic lens 1. The moving coil 4a is positioned in permanent magnet 4b and forced to the right along the optical axis as viewed on the diagram by a tension spring 5. When an electric current is fed to the moving coil 4a from a moving coil drive circuit 6, the moving coil 4a is moved to the left along the optical axis as viewed in the diagram against the pulling force of the tension spring 5.

The output signal of the image pickup device 3 is sent to a recording circuit (not shown) for use as a video signal in the usual way, and also input to an automatic focusing operation circuit 7. The automatic focusing operation circuit 7 processes the output signal from the image pickup device 3 and determines the condition of image formation.

The output, i.e. the position signal, obtained from the automatic focusing operation circuit 7 is transmitted to the moving coil drive circuit 6 via an automatic-manual selecting switch 8. The automatic-manual selecting switch 8 has a contact 8a for manual focusing, which is connected to a variable resistor 9 for manual focusing, and a contact 8b for automatic focusing which is connected to the output terminal of the automatic focusing operation circuit 7. One of these contacts 8a and 8b is selected to automatically or manually conduct focusing (i.e. positioning of the image pickup device 3 along the optical axis) through the moving coil drive circuit 6.

In the automatic focusing mode, when it is detected that the image pickup device 3 is positioned at the focusing point on the basis of the processing of the output signal thereof conducted by the operation circuit 7, the output of the moving coil drive circuit 6 is fixed at the drive signal for the focusing point to stop the moving coil 4 and the image pickup device 3. In this way, the video signal sent to the above-mentioned recording device is that obtained when the image pickup device 3 is correctly focused on the object. The manual focusing mode can be selected by connecting the selecting switch 8 to the contact 8a. In the manual focusing mode, the setting of the variable resistor 9 is manually changed to move the image pickup device 3 along the optical axis with the aid of the moving coil, and the image pickup device 3 is positioned at the focusing point by watching the condition of focusing of the image on a monitor (not shown) or the like. The focusing can be done electrically, unlike the case of the conventional focusing apparatus in which the photographic lens 1 is moved for focusing on the object. Accordingly, the apparatus in accordance with the present invention is particularly useful for conducting focusing from a position remote from the video camera. For example, it is particularly useful for a monitor camera used by focusing in advance at a predetermined distance when an object is not included within the field of view, waiting for the object to come within the field of view, and then automatically taking pictures at predetermined intervals under remote control.

Figure 2:
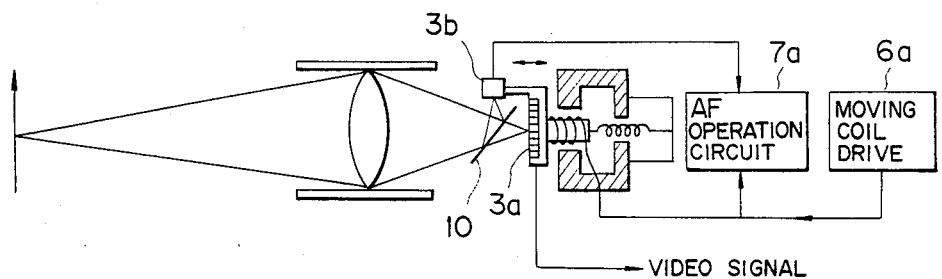
FIG. 2 is a schematic view showing another embodiment of the apparatus in accordance with the present invention comprising a split image pickup device.

In FIG. 2 showing another embodiment of the apparatus in accordance with the present invention, a component 3b of an image pickup device, e.g. a CCD image pickup device as used in the embodiment shown in FIG. 1, is positioned in the vicinity of an image pickup section 3a of the device. The center of the light flux is directed onto the component 3b to form an image thereon by a mirror 10, which may be a semi-transparent mirror or a total reflection mirror capable of being freely inserted into the light flux, so as to measure the distance mainly with the central part of the light flux. In case the mirror 10 is a total reflection mirror capable of being freely inserted into the light flux, the position of the image pickup section 3a is fixed after focusing, and then the mirror 10 is removed to take a picture. However, if pictures are to be taken of an object which moves frequently a semi-transparent mirror should be used as the mirror 10.

In the embodiment shown in FIG. 2, only the output of the image pickup component 3b serving to measure the distance from the object is input to an automatic focusing operation circuit 7a and the output of the image pickup section 3a used only for taking pictures is sent as a video signal only to the recording device. This differs from the embodiment shown in FIG. 1 in which the output of a solid state image pickup device 3 serving both to measure the distance from the object and to take pictures is input to the automatic focusing operation circuit 7. In the embodiment shown in FIG. 2, it is also possible to send the output of the section 3a used only for taking pictures to the operation circuit 7a as well so as to use it in combination with the output of the component 3b serving to measure the distance from the object, or to switch between the two outputs.

In the embodiment shown in FIG. 2, instead of the whole signal of the image pickup section 3a for taking pictures being used to measure the distance, the distance is measured using only the signal of the solid state image pickup component 3b. Accordingly, with this embodiment, it is possible, if desired, to measure the distance from the object only at the center of the image area. Further, it is also possible to select a desired portion of the signal obtained from the image pickup section 3a. Furthermore, the solid state image pickup component 3b may be mounted movably so as to measure the distance from desired object by finding the position through a finder.

Figure 3:
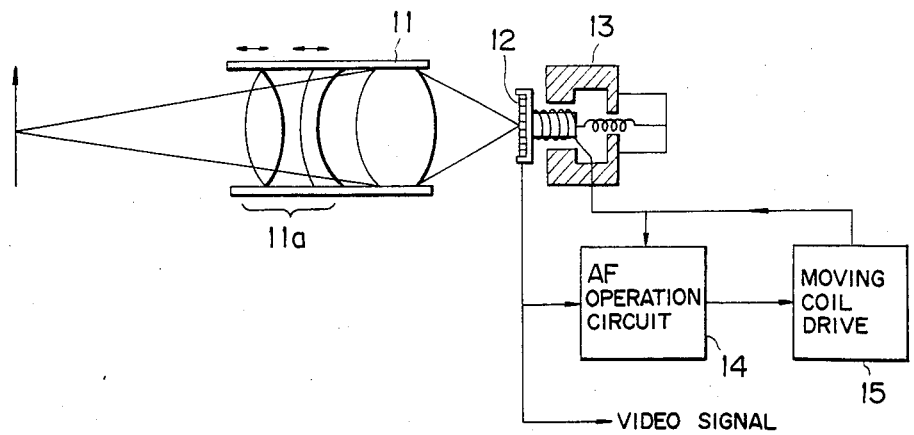
FIG. 3 is a schematic diagram showing a further embodiment of the apparatus in accordance with the present invention having a zoom lens.

FIG. 3 schematically shows a further embodiment of the apparatus in accordance with the present invention, in which a zoom lens 11 is used as the photographic lens. In this embodiment, zooming is conducted by moving movable lenses 11a for zooming of the zoom lens 11 along the optical axis, and focusing is effected by moving a solid state image pickup device 12 along the optical axis by a moving coil assembly 13. Namely, focusing can be done automatically by processing the output of the image pickup device 12 using an automatic focusing operation circuit 14 and controlling a moving coil drive circuit 15 by the output of the operation circuit 14 so as to move the image pickup device 12 along the optical axis. Accordingly, it is necessary for the lens system only to perform zooming in order to obtain the same function as that of the conventional zoom lens. Stated another way, the lens system in the embodiment shown in FIG. 3 does not require a mechanism for focusing, such as a focusing ring. This is extremely advantageous to facilitate the design and the manufacture of the zoom lens.

As described above, in the present invention, the solid state image pickup device on which the image of the object is formed is moved along the optical axis, and the output signal obtained from the image pickup device is used as the distance measurement signal. Accordingly, the apparatus in accordance with the present invention eliminates the need for using an additional distance measuring device, such as an ultrasonic distance measuring device, which is required in the conventional automatic focusing apparatus. Thus the apparatus in accordance with the present invention can achieve focusing automatically with an extremely simple construction.

Further, with the present invention, it is possible to use a zoom lens having no focusing function, and therefore the design and the manufacture of the zoom lens is greatly simplified.

We claim:

1. An automatic focusing apparatus for a video camera, comprising a photographic lens, a solid state image pickup device mounted movable in the direction of the optical axis of said photographic lens at a position for receiving an image of an object formed by said photographic lens and for forming a video signal, a moving means for moving said solid state image pickup device in the direction of said optical axis, and a focusing operation circuit for receiving the video signal output by said solid state image pickup device, processing said video signal output by said solid state image pickup device to produce a focusing signal and feeding said focusing signal to said moving means to cause said moving means to move said solid state image pickup device to the focusing point.

2. An apparatus as defined in claim 1 wherein said moving means comprises a moving coil secured to said solid state image pickup device, and a drive circuit for electrically driving said moving coil.

3. An apparatus as defined in claim 2 wherein said focusing operation circuit is connected with said drive circuit via an automatic-manual selecting switch.

4. An apparatus as defined in claim 2 or 3 wherein said coil is positioned in a permanent magnet.

5. An automatic focusing apparatus for a video camera, comprising a photographic lens, a solid state image pickup device mounted movably in the direction of the optical axis of said photographic lens at a position for receiving an image of an object formed by said photographic lens for generating a video signal, a moving means for moving said solid state image pickup device in the direction of said optical axis, and a focusing operation circuit for receiving the video signal output by said solid state image pickup device, processing said video signal output of said solid state image pickup device to produce a focusing signal and feeding said focusing signal to said moving means to cause said moving means to move said solid state image pickup device to the focusing point, wherein said solid state image pickup device is split into two sections, one for taking a picture and the other for measuring the distance from the object.

6. An apparatus as defined in claim 5 further comprising a semi-transparent mirror for directing the light flux to said section of said solid state image pickup device for measuring the distance from the object.

7. An apparatus as defined in claim 5 wherein only the output of said section of said solid state image pickup device for measuring the distance from the object is sent to said focusing operation circuit.

8. An apparatus as defined in claim 1 wherein said photographic lens is a zoom lens having no mechanism for focusing.

9. An apparatus as defined in claim 5 further comprising a total reflection mirror for directing the light flux to said section of said solid state image pickup device for measuring the distance from the object.

10. An apparatus as defined in claim 1, wherein said solid state image pickup device comprises a charge coupled device.

11. An automatic focusing apparatus for a video camera, comprising a photographic lens, a solid state image pickup device movably mounted along the optical axis of said photographic lens for receiving an image of an object formed by said photographic lens and for generating a video signal, means for moving said solid state image pickup device along said optical axis, a focusing operation circuit for receiving and processing the video signal output of said solid state image pickup device to produce a focusing signal and for feeding said focusing signal to said moving means for causing said moving means to move said solid state image pickup device to a position where said image of said object is properly focussed on said solid state image pickup device and to stop said solid state image pickup device at said position.

12. An apparatus as defined in claim 11, wherein said moving means comprises a moving coil secured to said solid state image pickup device, and a drive circuit for electrically driving said moving coil.

13. An apparatus as defined in claim 12, wherein said focusing operation circuit is connected with said drive circuit via an automatic-manual selecting switch.

14. An apparatus as defined in claim 12, wherein said moving coil is positioned in a permanent magnet.

15. An apparatus as defined in claim 11, wherein said solid state image pickup device is split into two sections, one for taking a picture and the other for measuring the distance from the object.

16. An apparatus as defined in claim 15, further comprising a semi-transparent mirror for directing the light flux to said section of said solid state pickup device for measuring the distance from the object.

17. An apparatus as defined in claim 15, wherein only the output of said section of said solid state image pickup device for measuring the distance from the object is sent to said focusing operation circuit.

18. An apparatus as defined in claim 11, wherein said photographic lens is a zoom lens having no mechanism for focusing.

19. An apparatus as defined in claim 15, further comprising a total reflection mirror for directing the light flux to said section of said solid state image pickup device for measuring the distance from the object.

20. An apparatus as defined in claim 11, wherein said solid state image pickup device comprises a charge coupled device.

* * * * *